United States Patent [19]
Lane

[11] Patent Number: 5,956,102
[45] Date of Patent: Sep. 21, 1999

[54] METHODS AND APPARATUS FOR THE EFFICIENT IMPLEMENTATION OF SIGNAL SYNCHRONIZATION AND CYCLIC REDUNDANCY CHECKS IN COMMUNICATION SYSTEMS

[75] Inventor: Frank A. Lane, Medford Lakes, N.J.

[73] Assignee: Hitachi America Ltd., Tarrytown, N.Y.

[21] Appl. No.: 08/964,681

[22] Filed: Nov. 4, 1997

[51] Int. Cl.⁶ .................................................. H04N 7/26
[52] U.S. Cl. ...................... 348/845.3; 348/716; 714/775
[58] Field of Search ................... 348/845.3, 716; 714/775, 785; 375/371; 370/503, 516, 517, 519; H04N 7/26

[56] References Cited

U.S. PATENT DOCUMENTS

| | | | |
|---|---|---|---|
| 4,059,825 | 11/1977 | Greene | 714/775 |
| 5,703,887 | 12/1997 | Heegard | 714/775 |

OTHER PUBLICATIONS

International Standards Organization—Moving Picture Experts Group, Recommendation H. 222.0, ISO/IEC 13818–1 "Information Technology—Generic Coding of Moving Pictures and Associated Audio: Systems" pp.i–viii; 1–155. (Nov. 13, 1994).

International Standards Organization—Moving Picture Experts Group, Recommendation H. 262, ISO/IEC 13818–2 "Information Technology –Generic Coding of Moving Pictures and Associated Audio Information: Video" pp.i–viii; 1–155. (Nov. 9, 1994).

International Telecommunication Union, ITU-T "Digital MultiProgramme Systems for Television Sound and Data Services for Cable Distribution" Recommendation J.83; pp. 1–5; annex A–D. (Oct. 1995).

SCTE Digital Video Subcommittee "Digital Video Transmission Standard for Cable Television" DVS031 Rev.1, pp. 1–17. (Mar. 27, 1997).

MCNS "Data–Over–Cable Interface Specifications, Radio Frequency Specification", Document No. SP–RFII01–970326, Interim Specification, pp. i –xiv, 1–174. (1997).

*Primary Examiner*—Howard Britton
*Attorney, Agent, or Firm*—Michaelson & Wallace; Peter L. Michaelson; Michael P. Straub

[57] ABSTRACT

Methods and apparatus for performing packet synchronization recovery and error detection operation on packets including a CRC check byte, e.g., MCNS packets, are described. The present invention uses a memory during a sync acquisition mode of operation to serve as a storage device for the output of a first function circuit. The delayed bits are used as the input along with current bits from the packet stream to a second function circuit. The second function circuit generates a syndrome byte of interest. When the received packets are error free and the decoder is properly aligned with the packet structure of the bitstream, the syndrome byte of interest will assume a preselected value, e.g., 47 Hex. Once packet synchronization has been achieved, the relatively few bits output by the first function circuit which are required as delayed inputs to the second function circuit are identified and stored using a delay register which is much smaller than the memory. By switching to the delay register, the memory previously used for feedback purposes is rendered available for use during sync lock mode for other purposes. Thus, the memory can be re-used as a packet data delay memory during sync lock mode operation. In such an embodiment, received packet data is delayed one packet time period so that the generated syndrome byte corresponding to the delayed packet data can be inserted into the packet stream as the first byte of a transport data packet thereby providing an error indicator signal at the start of a packet.

22 Claims, 9 Drawing Sheets

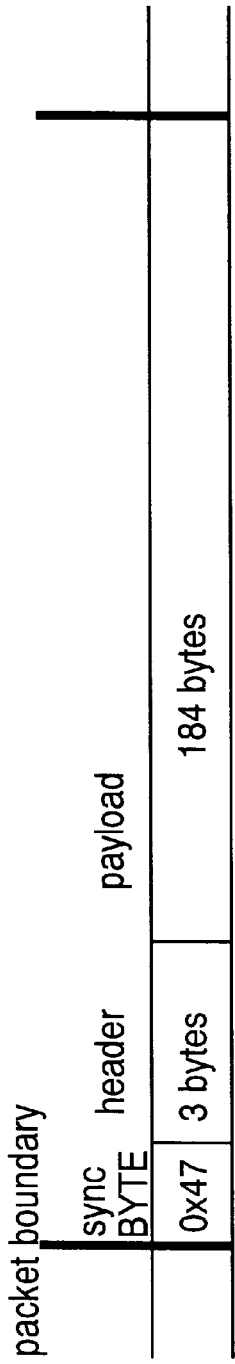
FIG. 1: MPEG Transport Packet Structure
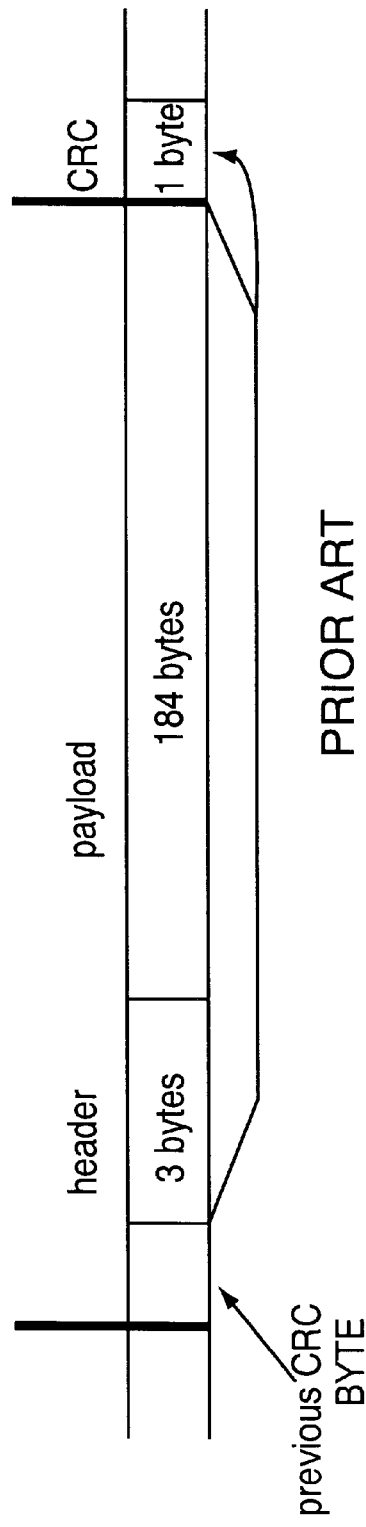
FIG. 2: MCNS Packet with CRC b(1497) = g(1497) + g(0) + g(-1) + g(-3) + g(-7)
b(1498) = g(1498) + g(1) + g(0) + g(-2) + g(-6)
b(1499) = g(1499) + g(2) + g(1) + g(-1) + g(-5)
b(1500) = g(1500) + g(3) + g(2) + g(0) + g(-4)
b(1501) = g(1501) + g(4) + g(3) + g(1) + g(-3)
b(1502) = g(1502) + g(5) + g(4) + g(2) + g(-2)
b(1503) = g(1503) + g(6) + g(5) + g(3) + g(-1)
b(1504) = g(1504) + g(7) + g(6) + g(4) + g(0)

b(x) in the range 1497 to 1504 is a function of g(x) in the range -7 to 7 plus current g(x)

METHODS AND APPARATUS FOR THE EFFICIENT IMPLEMENTATION OF SIGNAL SYNCHRONIZATION AND CYCLIC REDUNDANCY CHECKS IN COMMUNICATION SYSTEMS

FIELD OF THE INVENTION

The present invention relates to methods and apparatus for the efficient implementation of signal synchronization and cyclic redundancy checks in communications systems, e.g., communications systems involving the broadcast of data streams over cable television systems.

BACKGROUND OF THE INVENTION

The digital communication of data, e.g., video and audio data, continues to grow in importance as digital video and audio systems become ever more common. In order to properly decode an encoded bitstream, it is necessary to perform a synchronization function so that individual data packets and/or symbols included in the encoded bitstream can be properly identified and decoded.

MPEG 2 defines one standard for a data packet structure which is intended for transmitting, e.g., audio and video data. The MPEG 2 standard is described in the International Standards Organization—Moving Picture Experts Group, Recommendation H. 222.0, ISO/IEC 13818-1 "Information Technology—Generic Coding of Moving Pictures and Associated Audio" dated Nov. 13, 1994. The MPEG format defines a 188 byte (1504 bit) packet having the structure illustrated in FIG. 1. Note that an MPEG transport packet includes a sync byte having the value 47 HEX at the start of each transport packet. The sync byte is followed by a 3 byte header and a 184 byte payload. The first byte of the data packet, the synchronizing byte, is used as a synchronizing mechanism to allow for the recovery of the packet alignment in a transport bitstream. Packet alignment is normally achieved by detecting the repeating occurrence and position in the bitstream of the sync byte which is assigned the value 47 Hex.

In addition to packet synchronization, the detection and correction of errors in transmitted data is also important if the transmitted data is to be accurately decoded and used, e.g., displayed.

In order to facilitate error detection and correction in transmitted data, cyclic redundancy codes (CRCs) are frequently generated prior to transmission and added to, or incorporated into, a bitstream which is being transmitted. CRC codes, e.g., in the form of one or more CRC check bytes, can be used to identify and correct data errors. Such data errors may be introduced, e.g., during data transmission. Before a CRC code can be used to identify or correct a data error, bitstream synchronization must normally take place. Unless synchronization occurs, the bits corresponding to the CRC code can not be accurately identified and applied to the received data.

One particular standard which is based on MPEG is the multi-media cable network system (MCNS) standard described in the MCNS *Data-Over-Cable Interface Specifications, Radio Frequency Interface Specification*, Document No. SP-RFII01-970326, Interim Specification (1997). The MCNS standard describes a packet format intended to be used when cable television systems transmit, e.g., video and audio data. While the MCNS standard uses the MPEG transport stream format for the header and payload portion of a packet, rather than use the MPEG defined sync byte for packet alignment, the MCNS standard defines a CRC check byte which is used for both packet synchronization and alignment purposes. In the MCNS standard, the CRC check byte is calculated over the header and payload portion of a packet and then inserted as the first byte of the next packet, e.g., in the position where the MPEG sync byte would be located in the next packet of an MPEG transport stream. FIG. 2 illustrates the bytes used in generating a CRC byte for a transport packet and the placement within a packet stream of the generated CRC byte. At decoding time, processing of the bits of an MCNS transport packet by a syndrome decoder will result in a CRC syndrome which has as its output, the value 47 HEX, assuming correct packet alignment and error free transmission of the packet.

FIG. 3 illustrates a known encoder circuit 300 for generating an MCNS CRC byte. As illustrated, the encoder circuit 300 includes a plurality of 30 unit delay elements 302–331, nineteen summers 340–359, two switches 370, 371 and one delay element 380. The delay element 380 delays the signal input thereto by 1497 clock cycles. The various elements of the encoder 300 are coupled together as illustrated in FIG. 3. During the receipt of the first 1496 bits of input, the switches 370, 371 are in position "A" and, for the next 8 bits are switched to position "B" before being returned to position "A" at the start of the next data packet to be processed. The eight bits of the generated MCNS check byte are obtained from encoder checksum outputs b0 through b7.

A known apparatus 400 for performing a CRC MCNS check byte syndrome decoding operation is illustrated in FIG. 4. As illustrated, the known decoder includes 15 unit delay elements (402–416), 8 summers (420–427). The delay element 480 delays the signal input thereto by 1497 clock cycles. The various elements of the decoder 400 are coupled together to form the illustrated linear feedback shift register (LFSR) arrangement. The operation of the decoder 400 can be described in terms of two functions g(X) and b(X) as follows:

$$f(X) = [1 + X^{1497} b(X)]/g(X)$$

where $$g(X) = 1 + X + X^5 + X^6 + X^8$$

and $b(X) = 1 + X + X^3 + X^7$.

The output of the decoder 400 is the CRC syndrome. After all 1504 bits of the packet plus checksum have passed through the shift register arrangement of the decoder 400, the last 8 bits representing the CRC syndrome should contain the value 47 HEX. Any other value indicates that either the syndrome generator is not correctly aligned to the packet structure, or that an error occurred in the packet. Thus, the repeated generation of the value 47 HEX at the packet interval indicates proper packet alignment.

As described above, the MCNS specification uses a combined sync recovery and CRC polynomial check function. This combined function serves the dual purpose of allowing for the recovery of the packet and byte alignment to restore the transmitted data to an MPEG bitstream, while also performing an error detection operation on each received packet.

As discussed above the MCNS check byte can be used to check for the presence of errors in a received packet corresponding to a particular CRC check byte. As illustrated in FIG. 2, the MCNS check byte for a given packet is positioned in a bitstream following the packet. Accordingly, the CRC calculation used to check a packet for errors is only completed after the complete packet is received. The completion of the CRC calculation using known techniques, requires the use of a delay element capable of delaying the input by 1497 cycles which corresponds to a 1497 bit delay.

It is highly desirable that packets including errors not be used in processing operations which follow the packet synchronization and CRC operations. Thus, it is highly desirable that the error state of a packet be indicated (known) at the start, as opposed to the end, of a packet.

It is also desirable that the CRC function and any operation used to place packet error information at the start of a received packet be capable of being implemented using a minimal amount of storage capability, e.g., flip-flop delay elements and/or memory capacity, in order to reduce costs.

Accordingly, there is a need for methods and apparatus for implementing, in a cost efficient manner, packet synchronization and CRC error checking operations on a bitstream of packets, such as an MCNS packet stream, where a CRC check byte for a transmitted packet is positioned in the bitstream following the corresponding packet header and data. There is also a need for methods and apparatus which allow for the converting of such a bitstream into an MPEG transport packet stream, wherein a sync byte having a value 47 Hex is located at the start of a packet, assuming the packet is error free and/or for indicating an erred packet condition at the beginning of a packet.

SUMMARY OF THE PRESENT INVENTION

The present invention relates to methods and apparatus for the efficient implementation of signal synchronization and cyclic redundancy checks in communications systems, e.g., communications systems involving the broadcast of data streams over cable television systems.

The methods and apparatus of the present invention can be used to reduce the circuit requirements, as compared to known implementations, associated with decoders which perform packet synchronization operations and forward error correction (FEC) processing on MCNS data packets.

In accordance with the present invention a CRC decoder circuit which operates to perform both packet synchronization and error checking operates in one of two modes, 1) a packet sync acquisition mode and 2) a sync locked mode of operation.

The CRC decoder circuit of the present invention includes first and second function circuits, a memory having the capacity to store a relatively large number of bits, e.g., 1491 bits, and a delay register capable of storing relatively few bits, e.g., 15 bits.

The generation of a CRC syndrome byte from the bits of an input packet stream involves processing the data bits of a packet stream using the first function circuit, storing at least some of the bits generated by the first circuit for a preselected period of time and, operating the second function circuit to generate a CRC syndrome byte of interest using the current output of the first function circuit and at least some of the delayed bits previously output by the first function circuit.

During sync acquisition mode of operation, the packet boundaries within the input bitstream are initially unknown to the decoder circuit making it difficult or impossible to specifically identify the specific bits of the first function circuit output that should be stored and used in the generation of the CRC syndrome byte of interest. For this reason, during packet synchronization, the memory is used to store most or all of the bits generated by the first function circuit in a packet processing time period so that they can be used by the second function circuit. The output of the CRC syndrome generator is monitored for the occurrence of a preselected value, e.g., the value 47 HEX, indicative of a packet boundary. Packet synchronization is achieved by detecting the expected CRC syndrome value being repeatedly output at the known packet interval, e.g. 1497 bits.

Once packet synchronization has been achieved, it is possible to accurately identify which specific bits in the output of the first function circuit will be used by the second function circuit in generating the syndrome byte of interest.

In accordance with one embodiment of the present invention once packet synchronization has been achieved, the decoder circuit switches to a sync lock mode of operation. During sync lock mode operation, a relatively small register, e.g., having 15 or fewer bit locations, is used to store the bits needed by the second function circuit to generate the syndrome byte of interest. Accordingly, in sync lock mode operation the decoder of the present invention the memory used during acquisition mode operation can be used to serve other functions.

In one specific embodiment, the present invention uses the memory, used as a feedback memory during sync acquisition mode operation, as a packet data delay memory. In this manner the received packet data, used to generate a syndrome byte, can be delayed one packet time period.

In accordance with an embodiment of the present invention, the generated syndrome byte is combined with the delayed packet data by inserting the syndrome byte immediately preceding the delayed packet data. In such an embodiment, the syndrome byte can serve the function of a packet sync byte and error indicator signal. If the packet is erred, the syndrome byte will assume a value that is different than the expected sync byte value indicating to subsequent circuits receiving the packet that the data included in the packet is erred. In another embodiment, a byte having the value 47 hex, representing an MPEG sync byte, is inserted immediately preceding the delayed packet data. In the event that the syndrome byte indicates that an error exits in the delayed packet data to which the sync byte is added, the first bit of a header included at the beginning of the packet data is set to indicate that the packet data is erred.

The methods and apparatus of the present invention are particularly well suited for processing an M-NS packet stream to generate therefrom an MPEG packet stream. However, the methods and apparatus of the present invention can be applied to other types of decoders which employ a CRC check function which requires a relatively long feed forward delay.

In addition to the above described embodiments and features, numerous additional features, embodiments and advantages of the methods and apparatus of the present invention are discussed below.

BRIEF DESCRIPTION OF THE DRAWINGS

FIG. 1 illustrates the structure of an MPEG transport packet.

FIG. 2 illustrates the structure of an MCNS packet which includes a CRC byte.

DETAILED DESCRIPTION

As discussed above, the present invention relates to methods and apparatus for the efficient implementation of signal synchronization and cyclic redundancy checks in communications systems. The present invention is particularly well suited for use in systems which employ a CRC check function in conjunction with packet transmissions. As will be discussed below, the present invention simplifies the circuit requirements, as compared to known implementations, associated with decoders which perform packet synchronization operations and forward error correction (FEC) processing on MCNS data packets.

While the various embodiments of the present invention will be discussed, for purposes of explanation, in the context of an MCNS packet stream processing embodiment, the methods and apparatus of the present invention are also applicable to a wide variety of similar systems which employ a CRC check function which requires a long feed forward delay.

As discussed above, in the MCNS Data-Over-Cable RF interface specification there is a combined sync recovery and CRC polynomial check function performed on packet data. This function serves the dual purpose of 1) recovering the content of the transport packets and the byte alignment of the packets in an MCNS transport stream and 2) performing an error detection operation on each received packet.

The process of achieving synchronization with the packets in a received MCNS data stream, involves searching a block of data for a specific bit pattern, e.g., the value 47 HEX generated when the bits corresponding to an error free packet included in the received data steam are processed by a CRC check byte decoder.

Figure 3:
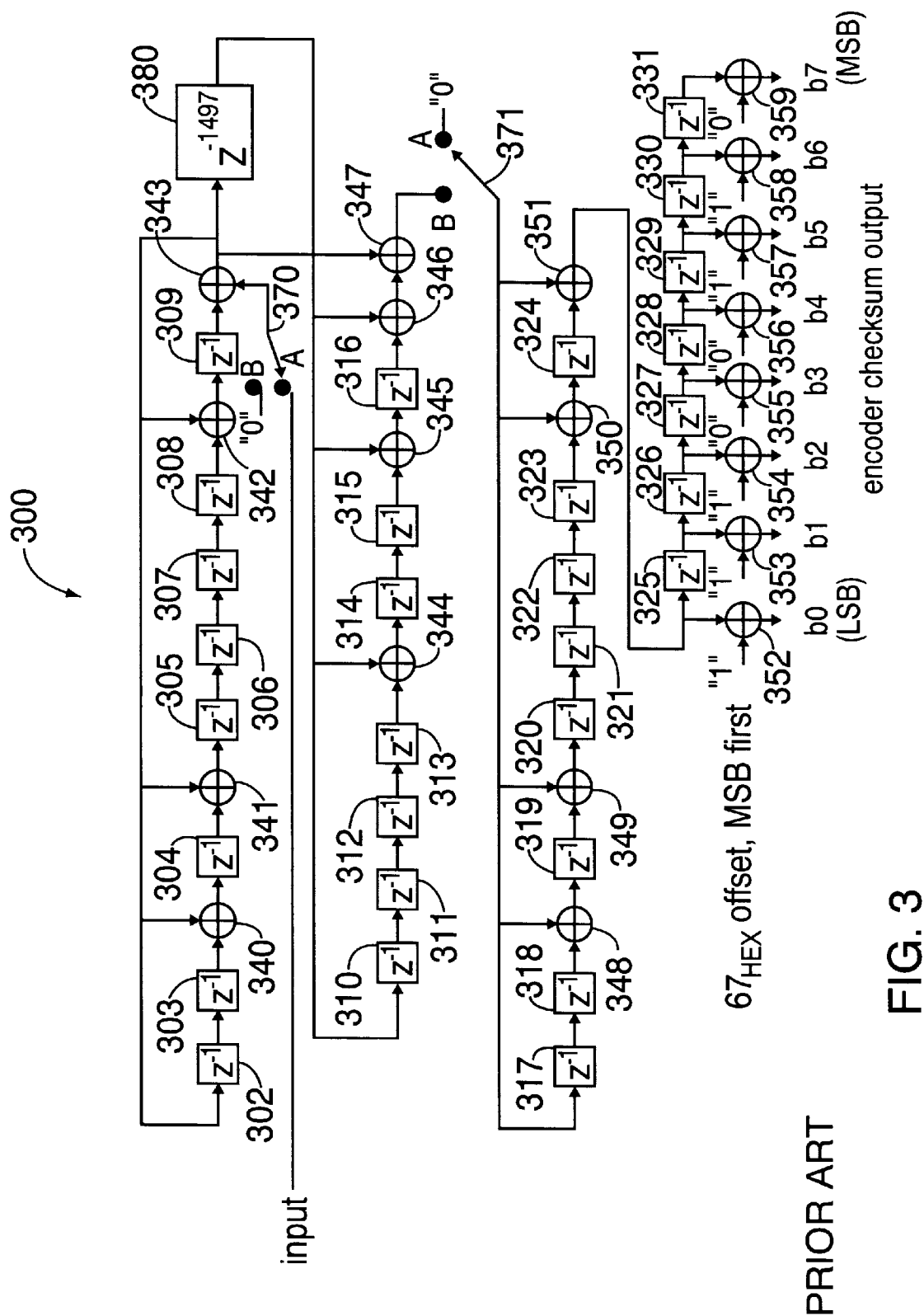
FIG. 3 illustrates a CRC encoder for generating a CRC check byte from the header and payload of a data packet.
Figure 4:
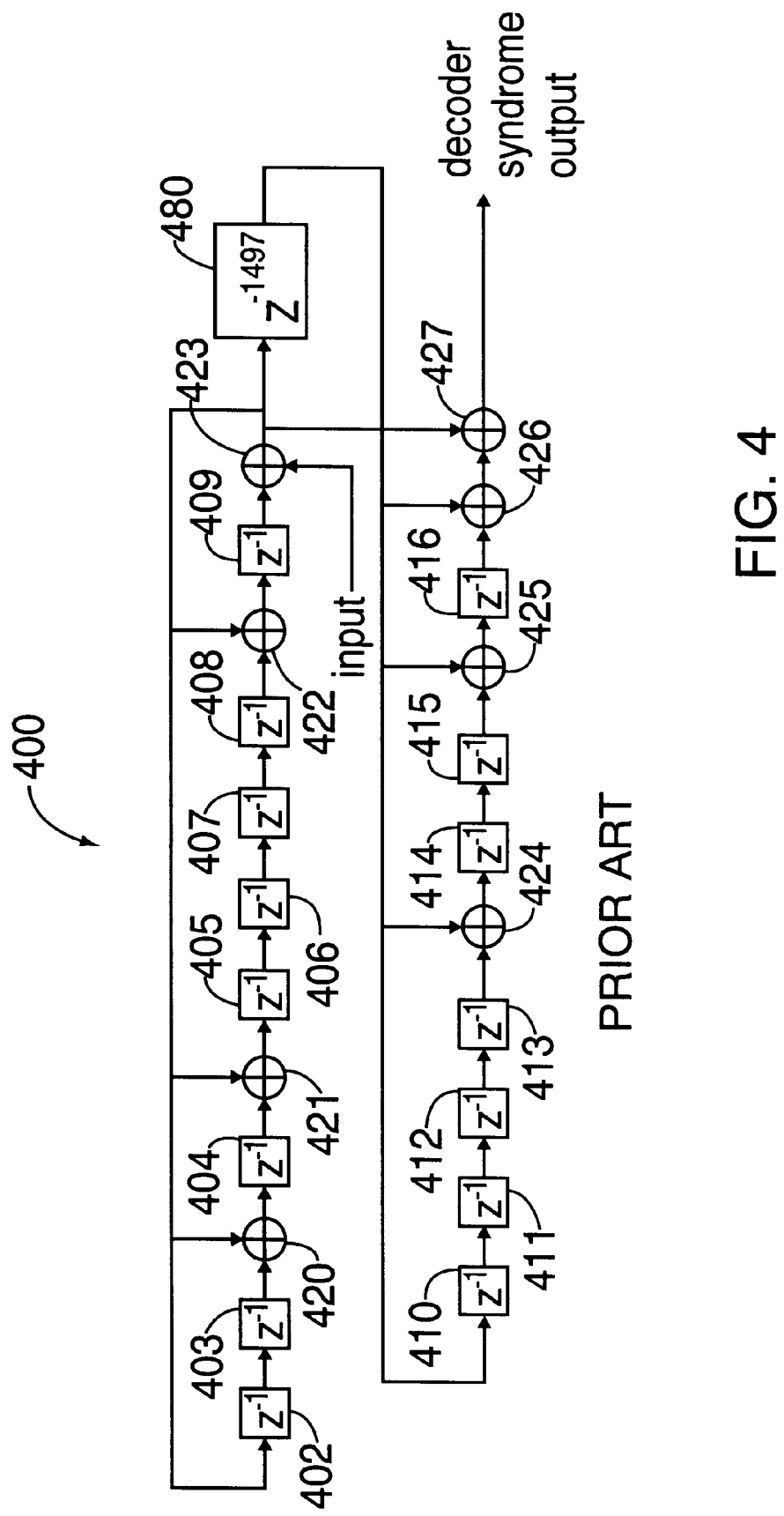
FIG. 4 illustrates a decoder for generating a CRC syndrome from the header, payload, and CRC check byte corresponding to an MCNS data packet.
Figure 5:
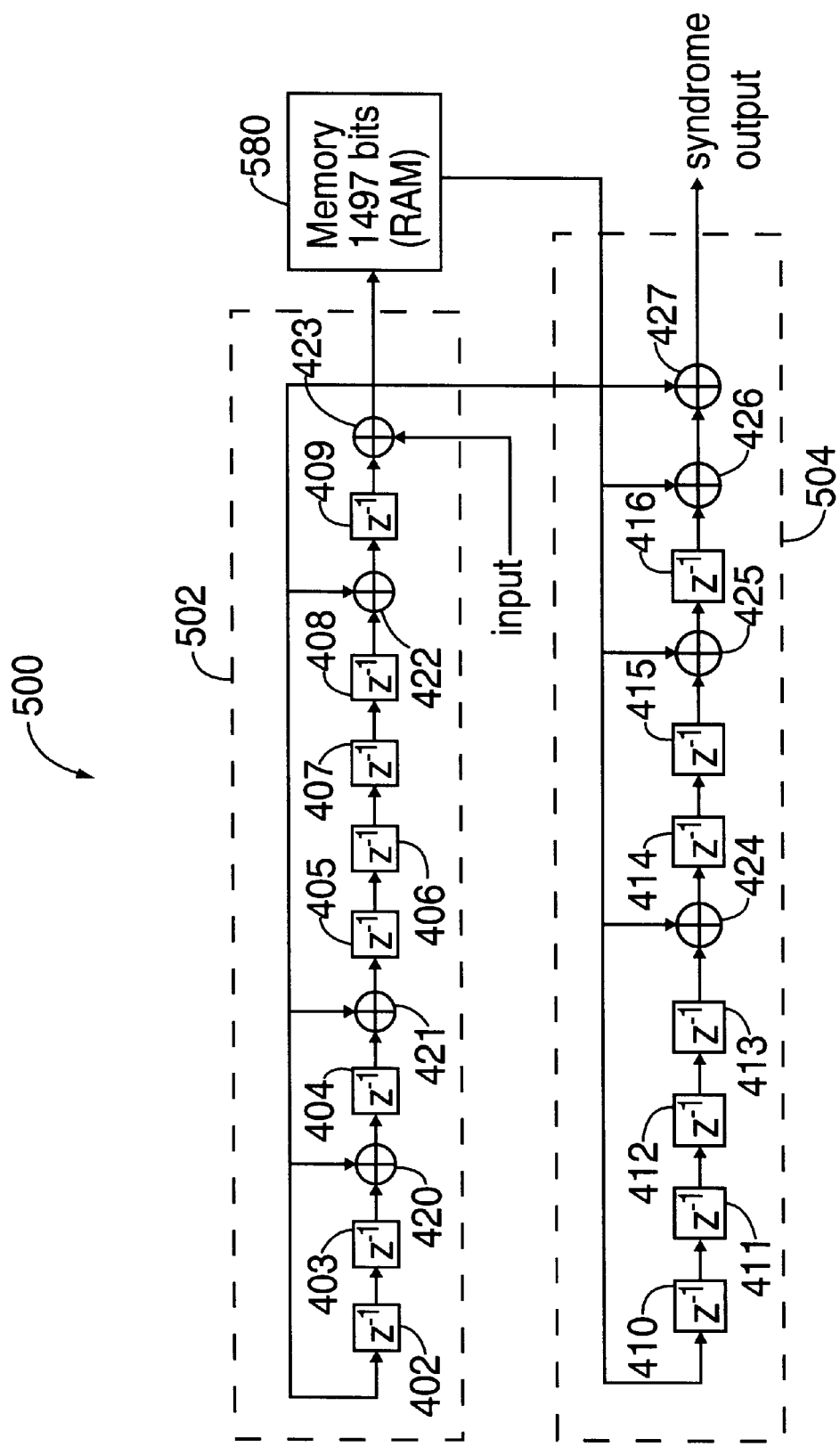
FIG. 5 illustrates a decoder, implemented in accordance with one embodiment of the present invention, for generating a CRC syndrome from the header, payload, and CRC check byte corresponding to an MCNS data packet.

Referring now to FIG. 5, there is illustrated a CRC check byte decoder capable of performing a decoding operation using an MCNS CRC check byte and the bits of a corresponding packet. The syndrome decoder circuit 500 illustrated in FIG. 5 is similar to the known decoder circuit illustrated in FIG. 4. Elements of the decoder circuit 500 which are the same as, or similar to, the elements of the known decoder 400, are identified using the same reference numerals as used in FIG. 4. The significant difference between the FIG. 4 and FIG. 5 decoders is that the FIG. 5 decoder uses 1497 bits of a random access memory 580 to replace the dedicated delay device 480 implemented using, e.g., flip-flops. The memory 580 serves as a feedback memory. The use of the RAM memory 580 offers advantages in terms of compactness of implementation and hardware flexibility. Thus, in the FIG. 5 embodiment, performing the CRC check function using the decoder 500 involves the use of data which is delayed by 1497 bits through the use of the RAM memory 580.

With the acquisition of the packet sync pattern, the generation of the CRC syndrome by the decoder circuit 500 serves as a check for the presence of errors in received packets. Unfortunately, the error checking for a received packet is normally not completed until the complete packet has been processed. That is, the data content of an entire error free packet must be processed before the sync value 47 HEX will be output by the decoder circuit 500. The output by the decoder 500 after processing a packet, of a value other than 47 HEX, when packet synchronization exists, indicates that a received packet includes errors.

Since the output of the decoder circuit 500 will equal the MPEG packet sync byte value when a packet is error free, it can be used to reconstruct an MPEG transport stream from the MCNS over cable packet stream. As illustrated in FIG. 1, the MPEG transport stream normally includes a sync byte having the value 47 Hex as the first byte of a transport packet. Furthermore, the output of the decoder circuit 500 can also be used as an error detection signal since it also indicates when an error in a packet has been detected.

As discussed above, it is useful to various processing functions following the decoder 500 if a packet error can be readily detected from examining the beginning of a the packet. In this manner, processing of erred packets can be avoided or handled differently than that of error free packets.

In accordance with one embodiment of the present invention, the CRC syndrome byte output by the decoder 500 is inserted into the corresponding packet which was used to produce the syndrome byte. In this manner, the syndrome byte which represents a packet error indicator signal becomes the first byte of an MPEG packet. In the case of an error free packet, this first byte will have the expected 47 HEX sync byte value thereby permitting the first byte to serve the dual roll of a sync byte and packet error indicator. Thus, in the case of error free packet transmissions, the method and apparatus of the present invention reconstructs an MPEG packet stream from a received MCNS packet stream.

In accordance with another embodiment of the present invention an MPEG sync byte, e.g., a byte having the value of 47 HEX, is inserted as the first byte of each data packet. In addition, the CRC syndrome output is checked to determine if the corresponding packet data included errors. If the CRC syndrome byte indicates that the packet data being processed includes errors, the sync byte/error indicator signal is set to a value that will cause the combining circuit to set the first bit of the corresponding packet header to indicate that the delayed packet data being processed by the combining circuit is erred. In this manner, an MPEG compliant packet stream is constructed from a received MCNS packet stream with an error indicator signal being included near the start of the generated MPEG transport packets to indicate whether or not the transport packet includes errors.

In order to use the syndrome byte generated by the decoder circuit 500 as the first byte of the packet which resulted in the generation of the byte, it is necessary to delay the packet data, e.g., header and payload, a complete packet time so that the packet data can be aligned with the corresponding error detection signal, e.g., the syndrome byte output by the decoder 500 or the error indicator bit to be inserted into the packet header. The delaying of the packet data can be achieved by using a second RAM of approximately the same size as the first delay RAM 580.

One embodiment of the present invention increases decoder circuit implementation efficiency by switching the feedback function performed by memory element 580 to a register delay having far fewer storage elements than the memory 580 after packet synchronization is achieved. The use of a relatively small number of storage elements instead of the memory 580 is possible once packet synchronization is achieved since only a few specific bits of delayed data are actually needed in the CRC calculation performed by the decoder circuit 580. Once the feedback function of memory element 580 is switched to the register delay in accordance with the present invention, the memory 580 can be re-used to delay the packet data. This allows the error indicator signal generated by a CRC decoder circuit implemented in accordance with the present invention to perform packet synchronization, error detection, and insertion of an error indicator signal into the first byte of a processed packet without the need for two distinct memories, e.g., one for delaying the majority of a packet's contents first for synchronization/error detection purposes and a second memory for delaying the packet contents to allow for the insertion of the generated error indictor at the start of the packet being processed.

In accordance with the present invention, once packet synchronization has been achieved, the feedback function of the memory 580 is shifted to a relatively small delay register, thereby freeing the memory 580 to be used to delay the packet data while the error indicator signal is being generated.

The first step in decoding the MCNS CRC byte for a received packet included in an MCNS packet stream involves achieving synchronization with the packet structure of the packet stream being processed. This can be done by applying techniques to acquire the normal MPEG packet sync byte (47 Hex) on the output of a LFSR, such as the circuit 500, used to decode the CRC check byte corresponding to a received packet. One way of doing this is to examine the last eight bits of the LSFR 500 after each new input bit is processed. The 8 bits are examined for a match to the sync pattern 47 Hex. Once the sync pattern is detected the method of the present invention involves waiting for 1504 bit times, e.g., the time required to shift the data of one full packet through the decoder 500, and then re-examining the output of the LFSR 500. If the sync pattern 47 Hex is again detected it indicates that the packet sync has been found. Multiple confirmations may be obtained in this manner before a packet synchronization lock is declared, e.g., by a sync search/error detect circuit such as the circuit 608 illustrated in FIG. 6.

Once a packet synchronization lock is achieved, then the output of the LSFR 500 need only be examined a the locations where the sync value will be output to determine if the CRC syndrome was correctly calculated, indicating an error free packet, or if an error occurred.

For purposes of implementing various embodiments of the present invention, the syndrome decoding LFSR 500 can be separated into there distinct parts or sections for analysis. The first section 502 is the g(X) polynomial portion, the second section 504 is the b(X) polynomial portion, and the last is the delay element $X^{1497}$ portion 580. g(X) is a function which can be implemented using an $8^{th}$ order LFSR, e.g. an LFSR including 8 unit delay elements 402–408. b(x) is a function which can be implemented using a $7^{th}$ order feed forward shift register, e.g., a feed forward shift register including seven unit delay elements. Each unit delay element used in the first and second decoder sections 502, 504 may be implemented using a 1 bit register.

The delay element $X^{1497}$ portion would require a significant gate array if implemented as a series of flip-flops, thus it is desirable to implement this portion 580 of the decoder 500 as a segment of RAM memory.

In order to improve memory access efficiency when using a RAM as the delay element $X^{1497}$, in one embodiment, memory access operations are performed using data segments that are larger than 1 bit, e.g., 7 bit segments are used when accessing memory. Since one of the stages preceding the decoder 500 is likely to be a Reed-Solomon decoder which operates on 7-bit symbols, it makes sense to operate both the LFSR used to implement the g(X) polynomial function and the memory using seven bits at a time.

Figure 6:
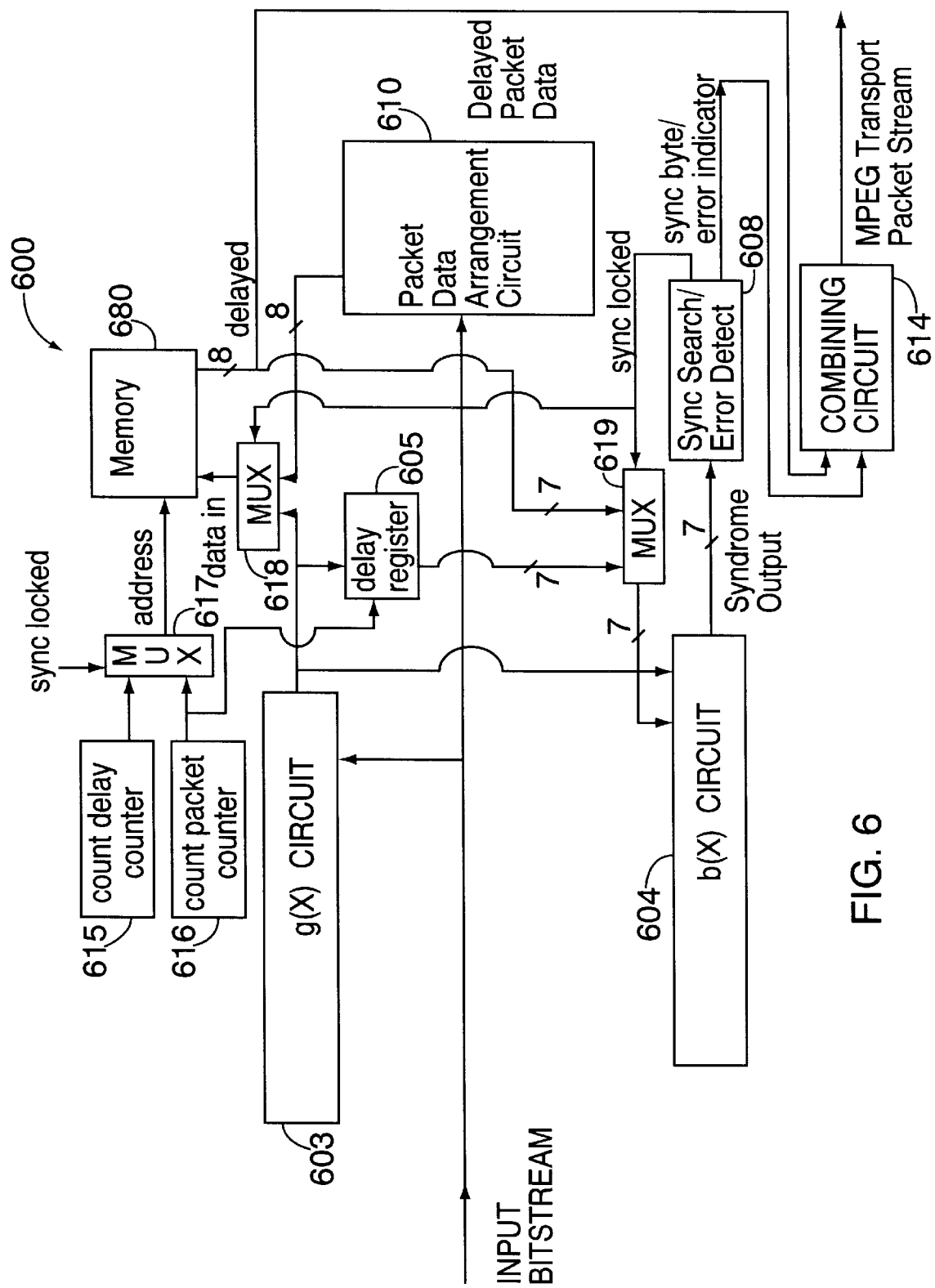
FIG. 6 illustrates a system for performing a CRC check byte decoding operation and for generating an MPEG transport stream from an MCNS packet stream.

FIG. 6 illustrates a circuit 600 implemented in accordance with the present invention capable of performing an MCNS packet stream synchronization operation and MPEG transport packet stream reconstruction operation. The circuit 600 inserts an error indicator signal at the start of a packet which serves as an MPEG sync byte in the case of an error free packet.

The circuit 600 includes a g(X) function circuit 603, a b(X) function circuit 604 and a memory 680. The memory 680, as will be discussed below, includes a memory segment which is used as the $Z^{-1497}$ delay element during a packet synchronization mode of operation and is then re-used, as a packet data delay circuit during a synchronization lock mode of operation. In addition to these three main elements 603, 604, 680, the circuit 600 includes various additional elements for controlling memory access, for switching between a packet synchronization mode of operation, and for detecting a synchronization lock.

Figure 9:
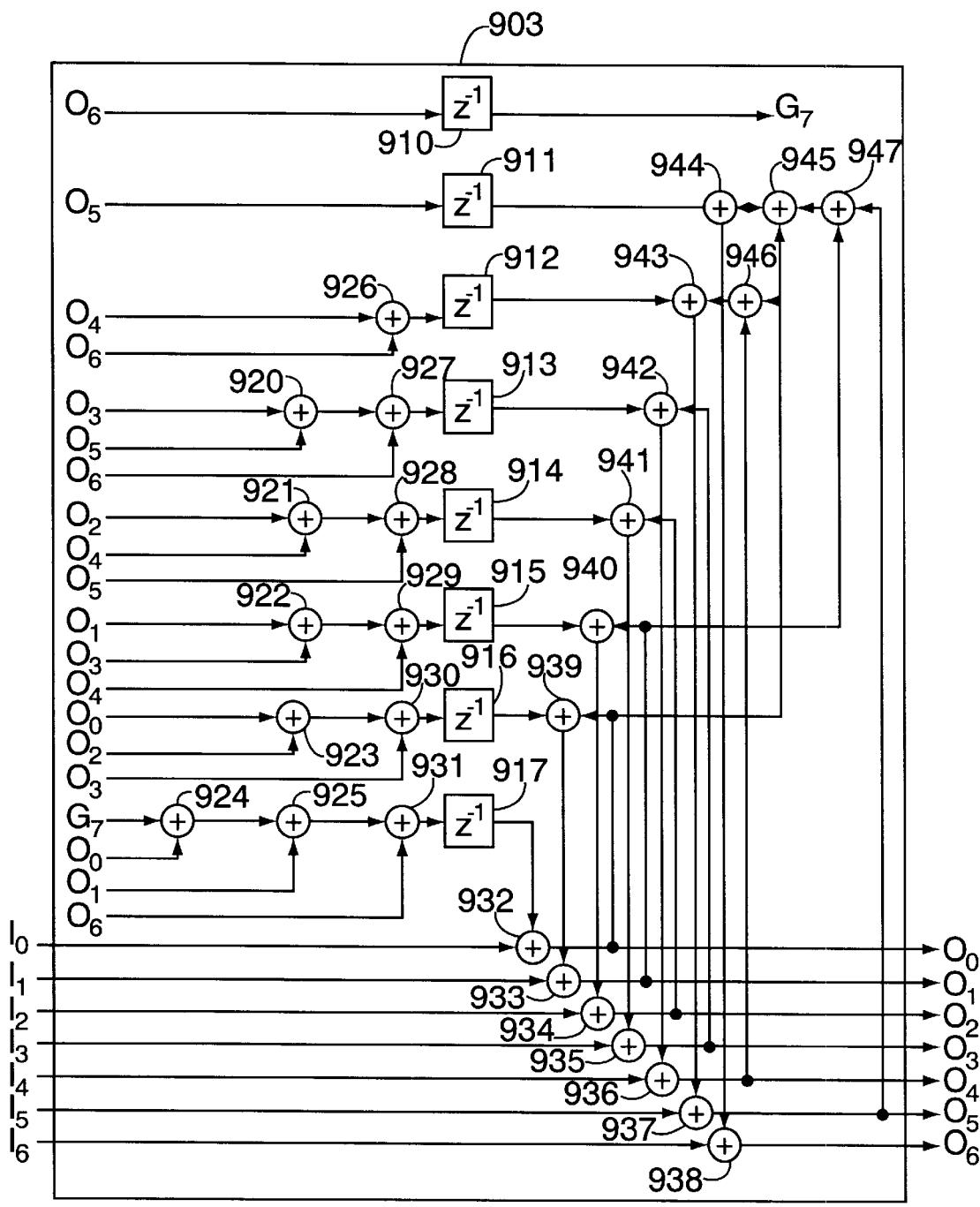
FIG. 9 illustrates a g(X) function circuit which can be used in accordance with a seven bit embodiment of the present invention.

Referring now briefly to FIG. 9, there is illustrated a circuit 903, suitable for use as the g(x) function circuit 602. The circuit 903 is designed to operate on 7 bits at a time.

As illustrated, the g(X) function circuit includes 8 unit delay elements 910–917 and 28 summers 920–947 which are coupled together in the manner illustrated in FIG. 9. The inputs ($I_0$, $I_1$, $I_2$, $I_3$, $I_4$, $I_5$, $I_6$) each correspond to one of the 7 bits of the input bitstream which serve as the current input to the g(X) function circuit 903. The outputs ($O_0$, $O_1$, $O_2$, $O_3$, $O_4$, $O_5$, $O_6$) represent a 7 bit output signal generated by the g(X) circuit 903.

Within the g(X) circuit 903, the output signals ($O_0$, $O_1$, $O_2$, $O_3$, $O_4$, $O_5$, $O_6$) are used as feedback signals. In addition, an internally generated signal G7, output by the delay element 910, is used as an input to the summer 924 when generating the output signals.

Figure 10:
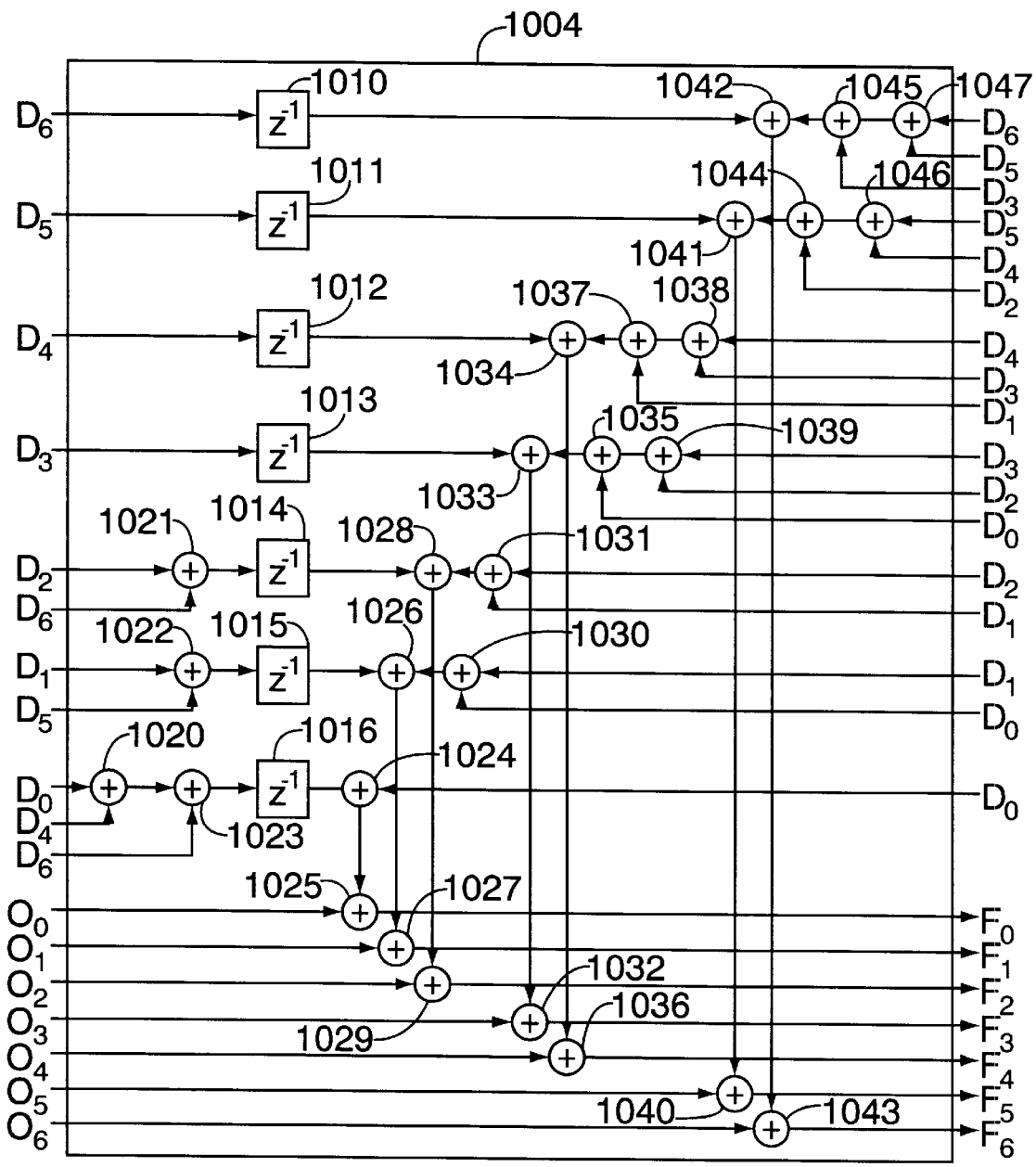
FIG. 10 illustrates a b(X) function circuit which can be used in accordance with the seven bit embodiment of the present invention to generate bits of the syndrome output.

Referring now to FIG. 10, there is illustrated a circuit 1004 which is suitable as the b(X) function generator circuit 604. The b(X) function generator circuit 1004 includes seven unit delay elements 1010–1016 and 28 summers 1020–1047 coupled together as illustrated in FIG. 10.

The b(X) function generator circuit 1004 receives as its input signals the current seven bits ($O_1$, $O_1$, $O_2$, $O_3$, $O_4$, $O_5$, $O_6$) output by the g(X) circuit 603 and seven bits ($D_0$, $D_1$, $D_2$, $D_3$, $D_4$, $D_5$, $D_6$) which correspond to selected previous outputs of the g(X) circuit, i.e., specific bits of one or more previous g(X) outputs, delayed by use of the memory 680 or delay register 605, required by the b(X) circuit to generate the output of the b(X) circuit. The bits which are stored in the delay register 605 will be discussed below in regard to FIGS. 7 and 8.

Since the b(X) function circuit 604 is a feedforward shift register circuit, the output only depends on input from a finite time in the past. In this case, the output is a function of the current output of the g(X) function circuit 603 and 4 delayed outputs from the g(X) function generator circuit. If we only desire to examine the output of the b(X) polynomial at a specific known time, for example, when the sync value 47 Hex is expected to occur, only the g(X) bits which are needed to calculated the b(X) values at the time of interest need be delayed and stored.

Figures 7, 8:
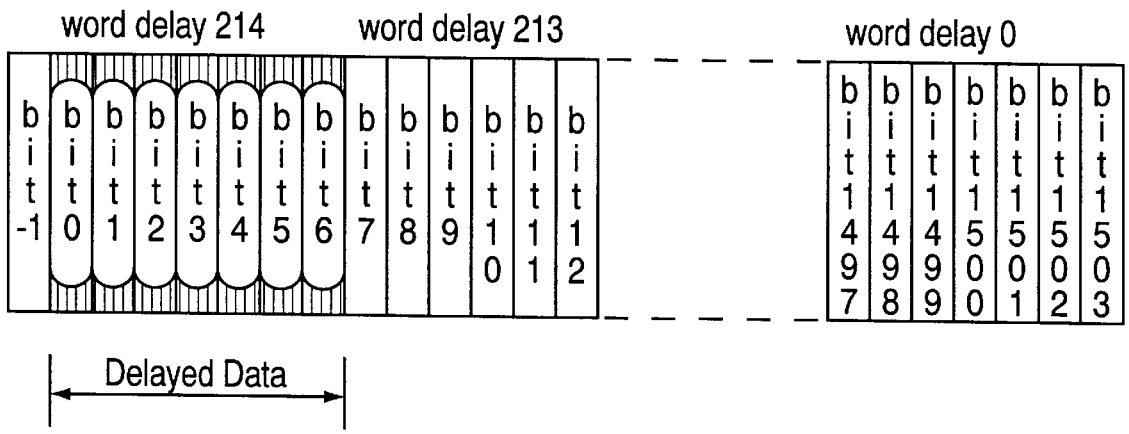
FIG. 7 illustrates the bits of a packet in a packet stream which need to be delayed for generation of the CRC syndrome once packet alignment has been achieved.
FIG. 8 illustrates the relationship between the 8 bits of a syndrome generator which represent the 8 bit CRC syndrome output of interest and various bit outputs of a preceding function circuit used in generating the CRC syndrome.

The syndrome output of interest corresponds to bits b(1497) through b(1504) of the value generated by the b(X) function circuit. FIG. 8 illustrates the dependency of the b(X) bits of interest, representing the syndrome output of the b(X) function circuit, and the output bits of the g(X) function circuit. Note that the bits of interest, the b(X) bits in the range of 1497 to 1504 are a function of the g(X) values in the range of −7 to +7, relative to the packet boundary, and the current g(X) input.

Accordingly, once the sync alignment is detected and the interest becomes the output of the CRC decoder at the sync times, we can simply store the appropriate 15 bits which are needed to be delayed to calculate the syndrome at the sync time as opposed to an entire 1497 bits. Thus, by using a register such as the delay register 605 to store the required 15 bits, once sync acquisition has been achieved, the memory 680 is free for use, e.g., as a packet data delay device.

In accordance with one embodiment of the present invention during sync lock mode operation, the current g(X) output bits and the contents of the delay register 605 are used to calculate the output of the b(X) function circuit at the time the sync value occurs.

The contents and operation of the decoder circuit 600 of the present invention during both packet sync acquisition and sync lock modes of operation will now be discussed in detail.

As discussed above, the three main components of the decoder circuit 600 are the g(X) function circuit 603, the b(X) function circuit 604 and the memory 680. The g(X) circuit receives as its input, bits of the input bitstream, e.g., bits from the MCNS packet stream being processed. The g(X) circuit generates a 7 bit output signal which is supplied to a first input of the b(X) circuit 604 and to a data input of a delay register 605 and a first input of the second MUX 618.

A second input of the b(X) circuit representing delayed data input is coupled to the output of the third MUX 619. Via this second input, the b(X) circuit receives bits corresponding to previous outputs of the g(X) circuit.

In addition to the three main components 603, 604, 680, the decoder circuit 600 includes first and second wrap around counters 615, 616, a delay register 605, a packet data arrangement circuit 610. The decoder circuit 600 also includes a sync search/error detect circuit 608, a combining circuit 614 and first second and third multiplexes (MUXes) 617, 618, 619.

The first and second counters 603, 604 are driven by the same clock signal used to control the passing of bits through the g(X) and b(X) function circuits 603, 604. These counters 615, 616 serve as memory address generators.

The first counter 615 generates a count delay signal which is used as a memory address for accessing the memory 680 during packet synchronization (sync lock acquisition) mode operation. The first counter 615 generates a count delay signal ranging in value from 0 to 212 decimal which corresponds to the shifting or loading into memory of 1491 bits assuming 7 bits are loaded into memory at a time.

Note that, since the delay interval of 1497 bits implemented using the memory 680 during the sync acquisition mode of operation is not evenly divisible by 7, the 7 bits of delayed data needed by the b(X) function circuit cannot simply be retrieved from the memory 680 by reading back one of the 7 bit words written into the memory from the g(X) function circuit output. The actual delay in terms of the 7 bit words output by the g(X) function circuit is 213.86 words. This means that part of the delayed data is read back with a 213 word delay and part is read back with a 214 word delay. FIG. 7 illustrates how the 7 bits used by the b(X) function circuit span the 7 bit words output by the g(X) function circuit 603. Accordingly, two 7 bit segments must be output from the memory 680 to provide the data from two different 7 bit words needed to generate the syndrome byte.

The second counter 615 generates a count packet signal which is used as a memory address for accessing the memory 680 during sync lock mode operation. The second counter 616 generates a count packet signal ranging in value from 0 to 187 which corresponds to the number (188) of 8 bit bytes included in a packet. Thus, when operating in sync lock mode as a packet delay element, the memory 680 outputs 8 useable bits of data at a time while in sync acquisition mode it outputs 7 usable bits at a time.

Sync acquisition mode operation of the decoder circuit 600 will now be described. During acquisition mode operation, the sync locked output of the sync search/error detect circuit 608 will be low. This signal controls the first, second and third MUXes 617, 618, 619. As a result of the sync lock signal being low, the output of the count delay counter 615 will be supplied via the first MUX 617 to an address input of the memory 680. At the same time, the output of the g(X) circuit will be supplied via the second MUX 618 to the data input of the memory 680.

During sync acquisition mode operation, the memory 680 is used as a delay buffer for delaying the output of the g(X) circuit for use by the b(X) circuit 604. During this mode of operation seven out of every 8 bits output by the memory 680 are supplied to the delayed data input of the b(X) circuit 604 via the third MUX 619.

The processing of the data by the g(X) and b(X) circuits 603, 604 occurs as discussed above with the syndrome output generated by the b(X) circuit being supplied to, and examined by, the sync search/error detect circuit.

Upon detecting a sync lock, e.g., via the repeated detection of the value 47 Hex at the expected packet interval, the sync search/error detect signal will assert the sync locked signal. In addition, the sync search/error detect signal will output the syndrome byte generated from the output of the b(X) circuit as the sync byte/error detect signal. In the case of an error free packet this signal will have the value 47 HEX.

Assertion of the sync lock signal causes operation of the circuit 600 to switch to a sync lock mode of operation. During this mode of operation, the packet data arrangement circuit 610 is used. the packet data arrangement circuit 610 receives as its input the bits of the input packet stream. It groups the bits into 8 bit bytes which are then supplied to a second input of the second MUX 618.

Assertion of the sync lock signal causes the first MUX 617 to couple the output of the count packet counter 616 to the address input of the memory 680. In addition, it causes the second MUX to couple the output of the packet data arrangement circuit 610 to the data input of the memory 680. Accordingly, during sync lock mode of operation the packet data received from the input bitstream is supplied to and stored in the memory 680 which severs during this mode of operation as a packet data delay circuit.

The output of the count packet counter is coupled to a control input of the delay register 605 and is used to control the delay register 605 to store preselected bits of the g(X) output signal, produced while processing the data corresponding to a data packet, for subsequent use by the b(X) circuit 604 in the generation of the syndrome byte. During sync lock mode of operation the output of the delay register 605 is coupled to the delayed data input of the b(X) circuit. Accordingly, during sync locked mode of operation, the delayed data supplied to the b(X) circuit is obtained from the delay register 605 and not the memory 680.

In the absence of packet errors, the sync byte/error indicator output of the sync search/error detect circuit 608 will be the value 47 Hex. During sync lock mode operation the combining circuit 614 receives the delayed packet data output by the memory 680 and the sync byte/error indicator signal. The combining circuit inserts, into its output bitstream, the received 8 bit sync byte error indicator signal before outputting the delayed packet data which was used to generate the sync byte/error indicator signal. In the event an error is detected by the sync search/error detect circuit 608, the sync byte/error indicator signal will assume a value other then 47 Hex and this value will be inserted at the start of the delayed packet data being output by the combining circuit 614 indicating an error with the packet data being output.

In the above described manner, the combining circuit 614 generates from the delayed received packet data and syndrome output of the b(X) circuit 604, an MPEG compliant transport packet stream assuming the receipt of error free MCNS packets or, in the case of erred packets, a data stream having an error indicator in the first byte of the erred packet in the place of an MPEG sync byte.

In the event that sync lock is lost, e.g., due to a period of extended signal interference, the syndrome output of the b(X) function circuit 604 will assume values other than 47 HEX for a series of packets. When multiple sequential non 47 HEX values are output by the b(X) function circuit, the sync search/error detect circuit 608 will detect this occurrence and de-assert the sync locked signal. De-assertion of the sync-lock signal will cause the operation of the circuit 600 to switch back to the sync acquisition mode of operation.

Figure 11:
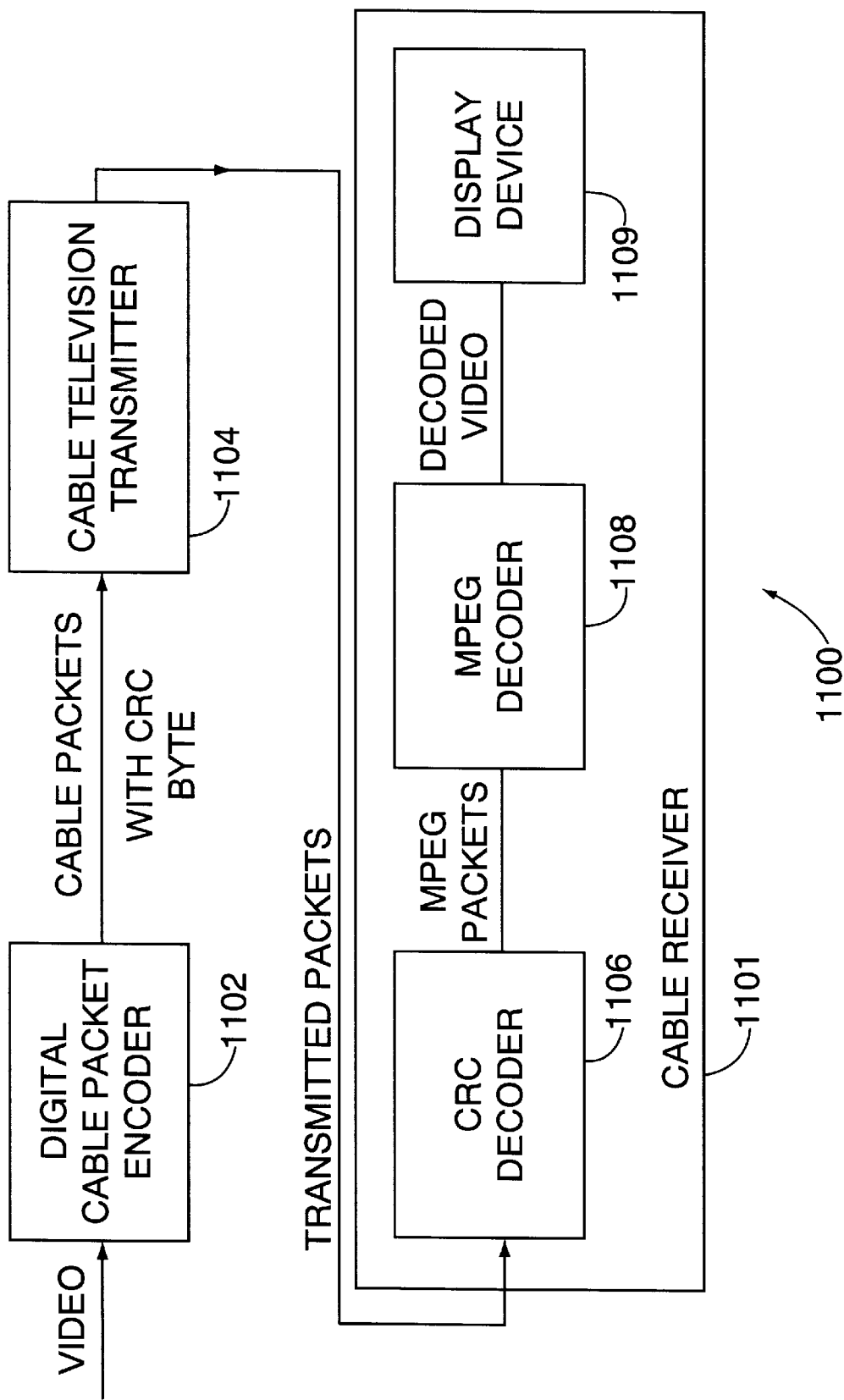
FIG. 11 illustrates a communication system implemented in accordance with an exemplary embodiment of the present invention.

Referring now to FIG. 11, there is illustrated a communication system 1100 implemented in accordance with one embodiment of the present invention. As illustrated, the communication system 1100 comprises an digital cable packet encoder, a cable television transmitter, and one or more cable receivers 1101.

The digital cable packet encoder 1102 receives unencoded video as its input and generates therefrom encoded cable packets which include a CRC check byte. The cable television transmitter 1104 transmits the cable packets, e.g., via cable TV lines, to a plurality of cable receivers 1101. Each cable receiver includes a CRC decoder 1106, e.g., of the type illustrated in FIG. 6. The decoder 1106 processes the transmitted packets and generates therefrom MPEG packets which may include an error indicator signal in a packet header as discussed above. The receiver also includes an MPEG decoder 1108 which receives the MPEG packets output by the decoder 1106, decodes the data, e.g., video data included therein, and supplies the decoded video data to a display device 1109. The display device 1109, e.g., an HDTV or computer display, is then used to display the decoded video data.

What is claimed is:

1. A method of processing a packet stream including a plurality of packets, a cyclic redundancy code being associated with each packet, the method comprising the steps of:
   performing a packet synchronization operation, the packet synchronization operation including the steps of:
   i. performing a cyclic redundancy code decoding operation using N memory locations of a memory storage device as a delay unit used in the cyclic redundancy code decoding operation, where N is an integer that is larger than half the number of bits included in each packet; and
   once packet synchronization has been achieved,
   ii. performing the cyclic redundancy code decoding operation to generate a syndrome of interest, using M memory locations of a delay device to store selected bits used in the cyclic redundancy code decoding operation, where M is an integer that is at least 5 times smaller than N; and
   iii. using at least N-M of the memory locations of the memory storage device, previously used in the cyclic redundancy code decoding operation, for a function other than that of a delay unit used in the cyclic redundancy code decoding operation.

2. The method of claim 1, wherein the step of using the N memory locations of the memory storage device for a function other than that of a delay unit used in the cyclic redundancy code decoding operation includes the step of:
   temporarily storing a majority of the data of a packet being processed.

3. The method of claim 2, wherein the packet stream being processed is an MCNS packet stream, the method further comprising the step of:
   generating an MPEG compliant transport packet stream from the processed packets once packet synchronization has been achieved.

4. The method of claim 2,
   wherein each of the processed packet is an MCNS packet including a cyclic redundancy check byte, a header, and a payload, the method further comprising the step of:
   generating an MPEG compliant transport packet stream, the step of generating an MPEG compliant transport packet stream including the steps of:
   i. inserting an MPEG sync byte in the place of a cyclic redundancy check byte;
   ii. examining the generated syndrome of interest to determine if the associated packet includes an error; and
   iii. if it is determined that a packet associated with the examined syndrome of interest includes an error, inserting into the header of the associated packet a signal indicating that the packet includes an error.

5. The method of claim 4, wherein the step of examining the generated syndrome of interest to determine if the associated packet includes an error includes the step of:
   comparing the generated syndrome of interest to a preselected value indicative of an error free packet.

6. The method of claim 5, further comprising the step of:
   monitoring the value of multiple sequential generated syndromes to detect the loss of packet synchronization; and upon detecting that packet synchronization has been lost, repeating the packet synchronization operation.

7. The method of claim 6, wherein detection of the loss of packet synchronization is determined to have occurred when at least 4 sequential generated syndromes do not match the preselected value indicative of an error free packet.

8. The method of claim 7, wherein the preselected value is the value of an MPEG sync byte.

9. The method of claim 8, wherein the generated MPEG transport packets include video data, the method further comprising the steps of:

decoding the video data included in the generated MPEG transport packets; and displaying the decoded video data on a display device.

10. The method of claim 9, wherein the display device is a high definition television receiver.

11. A method of processing bits included in a digital packet stream, the packet stream including a series of packets having a CRC check byte and packet data, the method comprising the steps of:

receiving bits included in the packet stream;

processing the received bits using a first function circuit;

storing a set of bits generated by the first function circuit in a segment of memory;

providing at least some of the stored bits to a second function circuit;

monitoring an output of the second function circuit to detect a packet synchronization condition; and in response to the detection of the packet synchronization condition, storing selected ones of the bits output by the first function circuit in a delay register being less than one tenth the size of the first memory segment; and using the first memory segment to store data other than the output of the first function circuit.

12. The method of claim 11, further comprising the step of:

operating the second function circuit to generate at least a portion of a syndrome byte.

13. The method of claim 12, wherein the step of monitoring the output of the second function circuit to detect a packet synchronization condition includes the step of:

monitoring for a preselected value to be output by the second function circuit at an interval corresponding to the packet interval.

14. The method of claim 12, wherein the first and second circuits operate on 7 bits at a time; and wherein the preselected value is 47 Hex.

15. The method of claim 12, wherein the step of using the first memory segment to store data other than the output of the first function circuit includes the step of:

storing, in the segment of memory, received packet data used to generate the portion of the syndrome byte output by the second function circuit;

the method further comprising the step of:

combining the packet data stored in the segment of memory with the portion of the syndrome byte output by the second function circuit.

16. The method of claim 15, further comprising the steps of:

examining the output of the second function circuit to determine if the packet data stored in the segment of memory includes a data error by examining the output of the second function; and wherein the step of combining the packet data stored in the segment of memory with the portion of the syndrome byte includes the steps of inserting into a header included in the packet data an error indicator signal when it is determined that the packet data includes a data error.

17. An apparatus for processing packets including a cyclic redundancy code and packet data, the apparatus comprising:

a first function circuit for receiving and processing the received packets to generate first function circuit output bits;

a memory coupled to the first function circuit for storing a first portion of the first function circuit output bits to generate delayed first function output bits during a packet synchronization mode of operation;

a data storage device coupled to the first function circuit for storing a second portion of the first function output bits during a packet synchronization lock mode of operation, the second portion of the first function output bits being less than one tenth the size of the first portion of the first function output bits, the data storage device generating the delayed first function output bits during a packet synchronization lock mode of operation;

a second function circuit for generating at least a portion of a syndrome byte as a function of the first function circuit output bits and delayed first function circuit output bits; and means for detecting the occurrence of a packet synchronization lock mode condition.

18. The apparatus of claim 17, further comprising a switching circuit coupled to an output of the memory, an output of the data storage device and an input of the second function circuit, the switching circuit being responsive to a mode indicator signal generated by the detecting means, to supply the delayed first function output bits from the memory to the input of the second function circuit during the packet synchronization acquisition mode of operation and to supply the delayed first function output bits from the data storage device to the input of the second function circuit during the packet synchronization lock mode of operation.

19. The apparatus of claim 18, wherein the memory is used to store packet data during the packet synchronization lock mode of operation, the apparatus further comprising:

means for combining packet data stored in the memory with an error indicator signal generated as a function of the output of the second function circuit.

20. The apparatus of claim 18, wherein the packets including a cyclic redundancy code are MCNS packets and wherein the means for combining packet data generates MPEG transport packets.

21. The apparatus of claim 20, further comprising:

a transmitter for transmitting the generated MPEG transport packets;

a decoder coupled to the transmitter for decoding the MPEG transport packets; and a data output device coupled to the decoder for outputting data included in the MPEG transport packets.

22. The apparatus of claim 21, wherein the decoder and the data output device are part of a high definition television receiver.

* * * * *